United States Patent [19]
Miller et al.

[11] Patent Number: 4,614,375
[45] Date of Patent: Sep. 30, 1986

[54] SUN VISOR STOWED ON PILLAR

[75] Inventors: Larry D. Miller; Thomas D. Drabik, both of Rochester, Mich.

[73] Assignee: General Motors Corporation, Detroit, Mich.

[21] Appl. No.: 789,949

[22] Filed: Oct. 21, 1985

[51] Int. Cl.$^4$ .............................................. B60J 3/00
[52] U.S. Cl. ................................................. 296/97 G
[58] Field of Search ............... 296/97 R, 97 G, 97 K, 296/97 C; 160/DIG. 3

[56] References Cited

U.S. PATENT DOCUMENTS

| 2,685,336 | 8/1954 | Menighan | 160/33 |
| 2,863,697 | 12/1958 | Watkins | 296/97 R |
| 3,071,408 | 1/1963 | Turner | 296/97 G |
| 4,005,899 | 2/1977 | Rigney | 296/97 E |
| 4,090,733 | 5/1978 | Altschul | 296/97 B |
| 4,323,275 | 4/1982 | Lutz | 296/97 G |

FOREIGN PATENT DOCUMENTS

| 600616 | 12/1959 | Italy . |
| 58-16442 | 9/1983 | Japan . |

Primary Examiner—Robert R. Song
Attorney, Agent, or Firm—Charles E. Leahy

[57] ABSTRACT

A sun visor includes a pivot link which is mounted generally vertically on the pillar and has a plurality of pivot means vertically spaced along the length thereof. A plurality of generally rectangular sunshade links, each with a width not greater than the width of the pillar, have first ends which are connected to the pivot means on the pivot link. The plurality of sunshade links also have second ends which are pivotally connected to an end connector link by plurality of pivot means spaced along the length of the end connector link. The sun visor has a use position in which the plurality of sunshade links extend horizontally parallel with the windshield header and in parallel side-by-side relationship with another to provide a sun visor of substantial dimension to shield the occupant's eyes. By pivoting the sun visor links downwardly, the sunshade links are maintained in parallel side-by-side relationship with one another but stack one upon another in overlying relationship to provide a stored position of the sun visor in parallel overlying relationship with the windshield pillar.

2 Claims, 3 Drawing Figures

U.S. Patent  Sep. 30, 1986  4,614,375
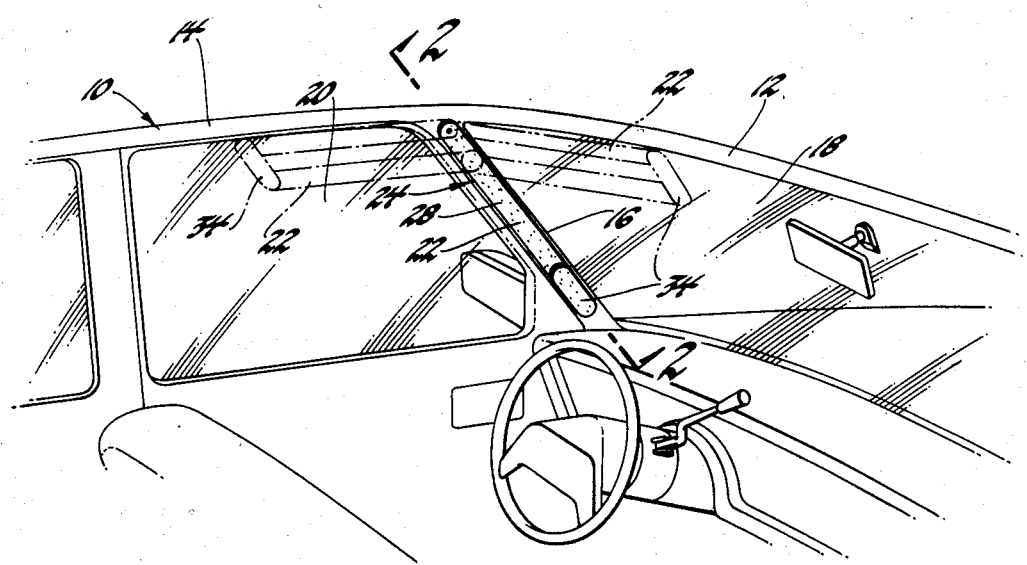
Fig. 1
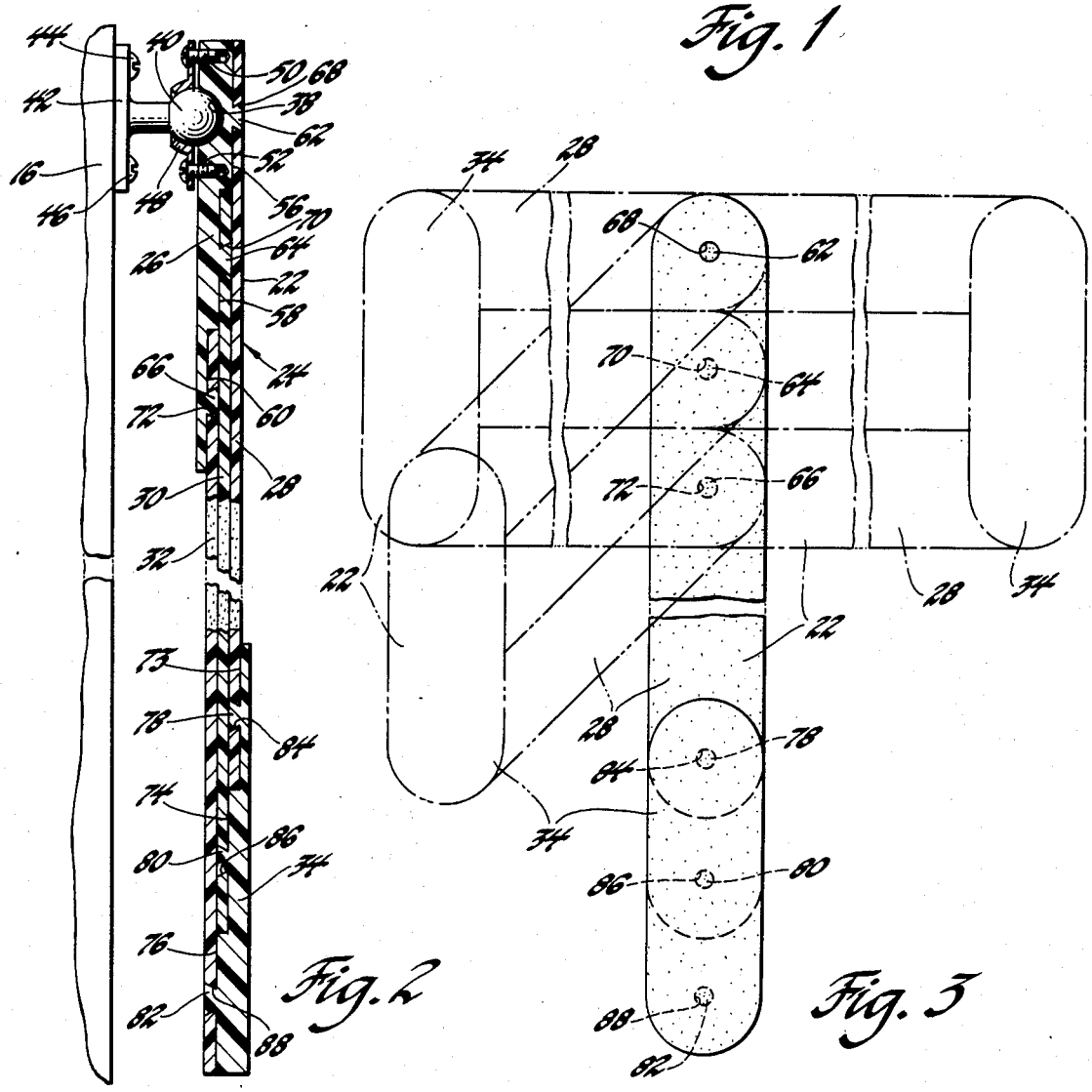
Fig. 2
Fig. 3

SUN VISOR STOWED ON PILLAR

The invention relates to a sun visor and more particularly provides a sun visor hinged at the top of the windshield pillar for movement between a conventional position shielding the occupant eyes and a vertical stowed position overlying the windshield pillar.

BACKGROUND OF THE INVENTION

It is well known in motor vehicle bodies to providea sun visor which may be moved into a use position partially covering the windshield opening to shade the eyes of a vehicle occupant. Such sun visors are traditionally pivoted about a horizontal axis so that the sunshade assumes a stored position adjacent to the vehicle roof. Furthermore, it is known that such a sun visor be pivoted about an axis so that the sun visor may be alternately deployed to partially cover either the windshield opening or the side window opening.

The present invention provides a new and improved sun visor which is pivotally mounted on the pillar for movement between a stored position overlying the windshield pillar and a horizontal use position.

SUMMARY OF THE INVENTION

According to the invention an elongated sun visor panel of either opaque or tinted material is pivoted on the vehicle body adjacent the juncture between the windshield pillar and the windshield header to enable pivotal movement between a vertical stored position overlying the windshield pillar and a horizontal position partially obstructing either the windshield opening or the side window opening.

More particularly the sun visor includes a pivot link which is mounted generally vertically on the pillar and has a plurality of pivot means vertically spaced along the length thereof. A plurality of generally rectangular sunshade links, each with a width not greater than the width of the pillar, have first ends which are connected to the pivot means on the pivot link. The plurality of sunshade links also have second ends which are pivotally connected to an end connector link by plurality of pivot means spaced along the length of the end connector link. The sun visor has a use position in which the plurality of sunshade links extend horizontally parallel with the windshield header and in parallel side-by-side relationship with an other to provide a sun visor of substantial dimension to shield the occupant's eyes. By pivoting the sun visor links downwardly, the sunshade links are maintained in parallel side-by-side relationship with one another but stack one upon another in overlying relationship to provide a stored position of the sun visor in parallel overlying relationship with the windshield pillar.

Accordingly, the object, feature and advantage of the present invention resides in the provision of a sun visor mounted on the vehicle body at the juncture of the windshield header and the windshield pillar for movement between a vertical stored position overlying the windshield pillar and a horizontal use position shielding the eyes of the vehicle occupant.

A further, object, feature and advantage of the present invention resides in the provision of a sunshade panel comprised of a pivot link extending vertically along the windshield pillar and having a plurality of sunshade links with one end pivoted on the pivot link by pivots spaced along the length of the pivot link and the other ends thereof pivotally mounted on an end connector link by pivots spaced along the length thereof to define a collapsible parallelogram for alternately defining a generally rectangular sun visor of substantial dimension when the sunshade links assume parallel side-by-side positions and a stored position in which the sunshade links and the end connector link lie one atop another atop the pivot link in a relatively thin profile which overlies the pillar in a manner not obstructing the vision of the occupant.

DESCRIPTION OF THE DRAWINGS

These and other features, objects and advantages of the invention will become apparent upon consideration of the specification and the appended drawings in which:

FIG. 1 is a perspective view of a vehicle body interior showing a sun visor according to the invention stored in overlying relationship with the windshield pillar and showing phantom line indicated use positions of the sun visor alternately deployed over the windshield opening and the side window opening;

FIG. 2 is a sectional view taken in the direction of arrows 2—2 of FIG. 1; and

FIG. 3 is an elevation view showing the alternate positions of the sun visor.

DESCRIPTION OF THE PREFERRED EMBODIMENT

Referring to FIG. 1, there is shown a motor vehicle body 10 including windshield header 12 and roof rail 14 which are supported by a windshield pillar 16 to respectively define a windshield opening 18, and a side window opening 20. A sun visor 22 is provided for shielding the eyes of the driver by alternately partially covering either the windshield opening 18 or the side window opening 20.

Referring to FIG. 2, it is seen that the sun visor assembly, generally indicated at 24, is comprised of a pivot link 26, a plurality of sunshade links 28, 30 and 32, and an end connector link 34. The links are preferably plastic and may be opaque or translucent. As best seen in FIG. 2, the pivot link 26 is mounted on the upper end of pillar 16 adjacent the juncture between the pillar 16, the windshield header 12 and the roof rail 14. More particularly, the pivot link 26 has a spherical recess 38 which receives a ball joint 40 having a base 42 attached to the pillar 16 by screws 44 and 46. Pivot link 26 is retained on the ball joint 40 by a retainer ring 48 attached by screws 50 and 52.

As best seen in FIG. 2, the pivot link 26 has a plurality of steps 56, 58 and 60 and integral pivot pins 62, 64 and 66 centered on each of the steps. The sunshade links 28, 30 and 32 each have a round aperture 68, 70 and 72 which respectively receive the pivot pins 62, 64 and 66 which are then heat staked to obtain an enlarged diameter by which the sunshade links 28, 30 and 32 are mounted for pivotal movement with respect to the pivot link 26.

As best seen in FIG. 2, the aforedescribed pivotal mounting of the sunshade links on the steps permits the sunshade links to be swung from generally horizontal positions parallel with one another and defining a rectangular sunshade of substantial dimension to a stored position shown in FIGS. 2 and 3 in which the sunshade links 28, 30 and 32 lie atop one another.

Referring again to FIG. 2, it is seen that the end connector link 34 has steps 73, 74 and 76 respectively having integral pivot pins 78, 80 and 82. The sunshade links 28, 30 and 32 respectively have apertures 84, 86 and 88 which receive the pivot pins which are heat staked to provide a pivotal connection between the connector link 34 and each of the sunshade links. Thus, as best seen in FIG. 3, the connector link 34 functions to always maintain the sunshade links 28, 30 and 32 in parallel relationship with one another during their pivotal movement between the horizontal sunshade forming position and the vertical stowed position.

As best seen in FIG. 3, it will be understood that the vertical spacing between the pivot pins on the pivot link 26 and the connector link 34, are spaced apart by a distance equal to the width of the sunshade links. Furthermore, as best seen in FIG. 2, the height of each of the steps is the same as the thickness of the sunshade links so that the sunshade links neatly overlie one another in the vertical stowed position.

Referring again to FIG. 1, it will be appreciated that the width of the pivot link 26, the sunshade links 28, 30 and 32 and the connector link 34 are preferably all the same and do not exceed the width of the pillar 16. Accordingly, when the sunshade assumes the stored position overlying the pillar, there is no additional obstruction of the occupant vision. The sunshade assembly 24 is pivotally raised from its solid line indicated stored position of FIG. 1 to either of its alternate sunshade positions shown in phantom line by raising the connector link 34 pivotally upward. In so doing the parallelogram-like linkage of the sunshade automatically deploys the sunshade links 28, 30 and 32 into their parallel side-by-side relationships extending horizontally along the top portion of the window opening to shield the occupant's eyes against the sun. The ball joint 40 functions to facilitate some swiveling movement of the connector link 26 to dispose the sunshade 22 over either the windshield opening 18 or the side window opening 20.

It will be understood that the size of the sunshade may be varied as desired by merely adding additional sunshade links of desired length.

Thus, it is seen that the invention provides a new and improved sun visor having a parallelogram like linkage which folds into a slender profile overlying the windshield pillar.

The embodiments of the invention in which an exclusive property or privilege is claimed are defined as follows:

1. A sun visor for shading the eyes of the occupant of a motor vehicle having a windshield header supported by a windshield pillar and comprising:

a plurality of generally rectangular sunshade links having first and second ends;

a pivot link pivotally connected to the first ends of the sunshade links and an end connector link pivotally connected to the second ends of the sunshade links;

means mounting the pivot link on the vehicle body at the juncture of the windshield header and the windshield pillar and in generally parallel relationship with the windshield pillar so that the plurality of sunshade links are pivotal about the pivot link between a horizontal sunshading position parallel with the windshield header in which the plurality of sunshade links are established in parallel extending side-by-side relationship to define a sunshade, and a stored position parallel with the windshield pillar in which the plurality of sunshade links overlie one another to provide a relatively thin profile which does not increase the view obstructing profile of the pillar.

2. A sun visor for shading the eyes of the occupant of a motor vehicle having a windshield header supported by a windshield pillar and comprising:

a pivot link mounted generally vertically on the vehicle body adjacent the juncture of the header and the pillar and in parallel relationship with the pillar;

a plurality of generally rectangular sunshade links each having a width not greater than the width of the pillar and having first and second ends;

a plurality of pivot means vertically spaced along the pivot link and pivotally mounting the first end of each sunshade link on the connector link, the spacing between the pivot means being generally equal to the width of a sunshade link;

an end connector link; and a plurality of pivot means spaced along the end connector link at a spacing equal to the width of a sunshade link and pivotally connecting the second ends of the sunshade links with the connector link whereby the pivot link and end connector link maintain the sunshade links in parallel relationship with one another during movement of the sunshade links between parallel side-by-side relationship in a horizontal position parallel with the windshield header to provide a sun visor of substantial dimension to shield the occupant's eyes and a vertical position in which the sunshade links overlie one another and the end links to provide a stored position of the sunshade in parallel overlying relationship with the windshield pillar.

* * * * *